(12) United States Patent
Lee et al.

(10) Patent No.: US 10,073,537 B2
(45) Date of Patent: Sep. 11, 2018

(54) USER INTERFACE DEVICE AND ELECTRONIC APPARATUS HAVING THE SAME

(71) Applicant: Samsung Electronics Co., Ltd., Suwon-si (KR)

(72) Inventors: Joo Yeon Lee, Gunpo-si (KR); Young Keun Lee, Seoul (KR); Whan Oh Sung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 196 days.

(21) Appl. No.: 13/795,715

(22) Filed: Mar. 12, 2013

(65) Prior Publication Data

US 2013/0235000 A1  Sep. 12, 2013

(30) Foreign Application Priority Data

Mar. 12, 2012 (KR) .................. 10-2012-0025193
Mar. 6, 2013 (KR) .................. 10-2013-0023932

(51) Int. Cl.
*G06F 3/02* (2006.01)
*G06F 3/0362* (2013.01)
*F24C 7/08* (2006.01)

(52) U.S. Cl.
CPC ............ *G06F 3/0227* (2013.01); *F24C 7/082* (2013.01); *G06F 3/0362* (2013.01)

(58) Field of Classification Search
CPC ........ H04N 9/7904; H04N 9/83; H04N 5/722; H04N 9/8205; G06F 3/0362; G06F 3/016; G06F 3/0338; G06F 3/03543; G06F 3/0227; F24C 7/082

USPC ......................................... 345/173, 174, 184
See application file for complete search history.

(56) References Cited

U.S. PATENT DOCUMENTS

| 5,039,832 A * | 8/1991 | Polacek ................. H03K 17/18 200/317 |
| 6,559,773 B1 * | 5/2003 | Berry ..................... B60K 35/00 340/531 |
| 2003/0206151 A1 * | 11/2003 | Oross ....................... G05G 9/02 345/156 |

(Continued)

FOREIGN PATENT DOCUMENTS

| JP | 10-171577 | 6/1998 |
| JP | 2010-36618 | 2/2010 |
| KR | 10-2006-0117425 | 11/2006 |

OTHER PUBLICATIONS

Extended European Search Report dated Feb. 10, 2016 in European Patent Application No. 13158819.6.

(Continued)

*Primary Examiner* — Mihir K Rayan
(74) *Attorney, Agent, or Firm* — Staas & Halsey LLP

(57) ABSTRACT

An electronic apparatus includes a user interface device to set and control a function of an electronic apparatus, including a display unit configured to display screens for option groups of the function, a knob configured to enable a manipulation by a user, a depth sensor unit configured to sense depth of the knob, and a control unit, if the function is selected, configured such that an option group transition of the selected function is performed based on depth information according to the manipulation by the user, and a screen of an option group to which the option group transition is made is displayed.

16 Claims, 27 Drawing Sheets

(56) References Cited

U.S. PATENT DOCUMENTS

| | | | |
|---|---|---|---|
| 2004/0046751 A1* | 3/2004 | Heimermann et al. | 345/184 |
| 2004/0164957 A1* | 8/2004 | Yamaguchi et al. | 345/156 |
| 2004/0207607 A1* | 10/2004 | Specks et al. | 345/184 |
| 2004/0243255 A1* | 12/2004 | Gonzales | D06F 39/005 700/14 |
| 2005/0168435 A1* | 8/2005 | Reed | B60H 1/0065 345/156 |
| 2006/0171675 A1* | 8/2006 | Kolletzki | 386/95 |
| 2007/0095634 A1* | 5/2007 | Misuda | G01D 5/252 200/11 R |
| 2007/0150842 A1* | 6/2007 | Chaudhri | G06F 3/04883 715/863 |
| 2008/0204427 A1* | 8/2008 | Heesemans et al. | 345/174 |
| 2008/0235614 A1* | 9/2008 | Ricklefs et al. | 715/783 |
| 2008/0289940 A1* | 11/2008 | Kim et al. | 200/336 |
| 2008/0297475 A1* | 12/2008 | Woolf et al. | 345/163 |
| 2009/0080176 A1* | 3/2009 | Claprood | 362/23 |
| 2010/0229867 A1* | 9/2010 | Bertinetti et al. | 128/205.25 |
| 2011/0025488 A1 | 2/2011 | Leon | |
| 2011/0025652 A1* | 2/2011 | Bonne | B60K 37/06 345/184 |

OTHER PUBLICATIONS

European Office Action dated May 18, 2017 in European Patent Application No. 13158819.6.
European Summons to Attend Oral Proceedings dated Feb. 7, 2018 in European Patent Application No. 13158819.6.

* cited by examiner

USER INTERFACE DEVICE AND ELECTRONIC APPARATUS HAVING THE SAME

CROSS-REFERENCE TO RELATED APPLICATIONS

This application claims the priority benefit of Korean Patent Applications No. 10-2012-0025193, filed on Mar. 12, 2012, and No. 10-2013-0023932, filed on Mar. 6, 2013, in the Korean Intellectual Property Office, the disclosures of which are incorporated herein by reference.

BACKGROUND

1. Field

The following description relates to a user interface device capable of providing a user with a convenience in the operability of the device, and an electronic apparatus having the same.

2. Description of the Related Art

Various types of electronic apparatuses including home appliances, such as a washing machine, a refrigerator, an oven, and an air condition, for example, are provided with a user interface device enabling a user to select a desired function.

In recent years, various user interface devices have been suggested for a distinctive user interface as well as superior design in an attempt to offer an electronic apparatus having various user interfaces.

According to such an effort, a single product is able to be equipped with various functions, but if a large number of functions are simply grouped by functionalities and applied to a product, there is a need for various input types and methods corresponding to the number of functions equipped to perform the respective functions, causing a user to have a difficulty in using the product. Such a difficulty occurs when the user interface fails to reduce the gap between a user and the technology, leading to a user feeling a burden involved with manipulating the product.

That is, a conventional user interface device requires a large number of button manipulations to select the type of a desired function, select multistage-option groups of the selected function, select an option of the function selected at each option group, or class, and execute the corresponding function by reflecting the option selected at each option group. In addition, in order to support an interaction with various functions, additional buttons or input keys are required.

SUMMARY

Therefore, it is an aspect of the present disclosure to provide a user interface device capable of enabling an option group transition of a function while executing the function by use of a single knob, and an electronic apparatus having the same.

Additional aspects of the disclosure will be set forth in part in the description which follows and, in part, will be obvious from the description, or may be learned by practice of the disclosure.

In accordance with an aspect of the present disclosure, a user interface device to set and control a function of an electronic apparatus includes a display unit, a knob, a depth sensor unit, and a control unit. The display unit may be configured to display screens by option groups of the function. The knob may be configured to enable a manipulation by a user. The depth sensor unit may be configured to sense a depth of the knob. The control unit, if the function is selected, may be configured such that an option group transition of the selected function is performed based on depth information according to the manipulation by the user, and a screen of an option group to which the option group transition is made is displayed.

The control unit, if the option group to which the option group transition is made is a last option group and a selection of an option value on a screen of the last option group is completed, may output a signal to execute the selected function.

The user interface device may further include a storage unit in which option values, which are selected at the screens by the option groups of the selected function, respectively, may be sequentially stored. The control unit, if the selection of the option value on the screen of the last option group is completed, may output the signal to execute the function based on a series of information of the option values stored in the storage unit.

The knob may be configured to enable a pressing manipulation by a user. The user interface device may include a rotation sensor unit to sense an angle of rotation of the knob. The control unit, when the screen of the option group to which the option group transition is made is displayed, may recognize the option value selected by the user based on the angle of rotation sensed through the rotation sensor unit.

The knob may be configured to enable a pressing operation by the user, and at the time of releasing the pressing, may remain pressed at a depth formed at the time of being pressed.

The knob may be configured to be pressed by the user, and at the time of releasing the pressing, may be extended to an original position.

The user interface device may further include a knob display unit that may be configured to display a change in a depth of the knob according to the manipulation of the knob.

The knob display unit may include a plurality of lamps having concentric circles.

The control unit may be configured to sequentially light the lamps of the knob display unit according to the depth information of the knob sensed by the depth sensor unit.

The control unit may increase the number of the lamps being lit as the depth of the knob becomes deeper.

The display unit may be embedded at the inside of the knob.

The user interface device may further include a button unit that may be installed at the inside of the knob to output a signal according to a button manipulation by the user. The control unit, if an option group to which the option group transition is made is a last option group, and in a state that a selection of an option value on the screen of the last option group is completed, a manipulation signal for the button unit is input, may output a signal to execute the selected function.

In accordance with an aspect of the present disclosure, a user interface device to set and control a function of an electronic apparatus includes a knob, a knob touch screen unit, a rotation sensor unit, a storage unit, and a control unit. The knob may be configured to enable a manipulation by a user. The knob touch screen unit may be provided at the inside of the knob and configured to display screens by option groups of the function. The rotation sensor unit may be configured to sense an angle of rotation of the knob. The storage unit may be configured to sequentially store option values that are selected at the screens by the option groups of the function, respectively. The control unit may be configured such that an option group transition is performed on a selected function according to a touch operation by the user, a screen of an option group to which the option group transition is made is displayed, an option value selected by the user is recognized based on the angle of rotation sensed by the rotation sensor unit when the screen of the option group to which the option group transition is made is displayed, the recognized option value is stored in the storage unit, and if the option group to which the option group transition is made a last option group and a selection of an option value on a screen of the last option group is completed, a signal to execute the selected function is output.

In accordance with an aspect of the present disclosure, a washing machine includes the user interface device described above.

In accordance with an aspect of the present disclosure, an oven includes the user interface device described above.

As described above, the user interface device in accordance with an aspect of the present disclosure, the option group transition and the execution of a function are achieved by use of a single knob, thereby reducing the installation space while reducing the burden of a user involved with manipulating the user interface device.

In addition, the option group transition and the execution of a function in electric home appliances such as a washing machine, a refrigerator, an oven, and an air conditioner, for example are achieved by use of a single knob, so that the user experience is optimized and the user convenience is improved, thereby implementing a customized system.

In addition, because the option group transition and the execution of a function are achieved by use of a single knob, the design of a product is simplified, the emotional quality of a user and the functional quality of the product are improved, and product differentiation and user satisfaction are obtained.

In addition, the single knob configured to perform the option group transition and the execution of a function may be inserted into the body and hidden at a time of non-use.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
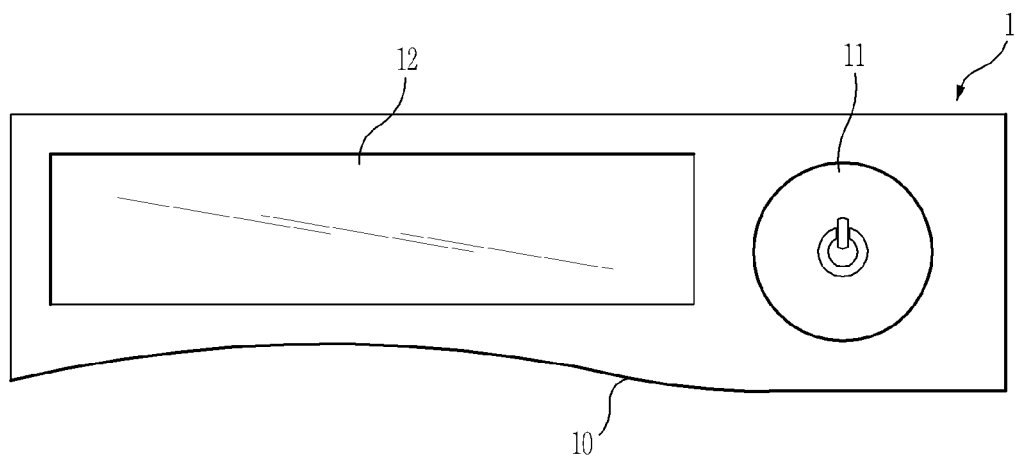
FIG. 1 is a drawing illustrating the configuration of a user interface device in accordance with an embodiment of the present disclosure.

Reference will now be made in detail to the embodiments of the present disclosure, examples of which are illustrated in the accompanying drawings, wherein like reference numerals refer to like elements throughout.

Figure 2:
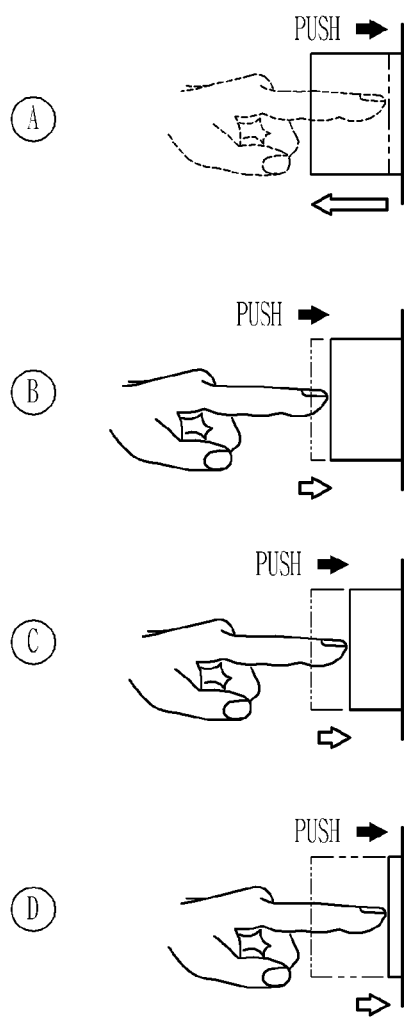
FIG. 2 is a drawing illustrating an example of the manipulation of a knob in the user interface device in accordance with an embodiment of the present disclosure.
Figure 3:
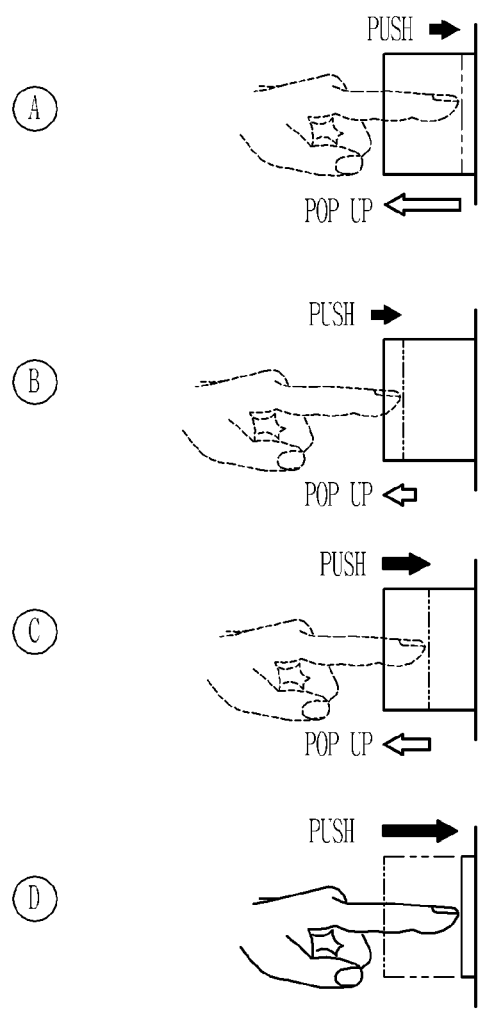
FIG. 3 is a drawing illustrating an example of the manipulation of the knob in the user interface device in accordance with an embodiment of the present disclosure.
Figure 4:
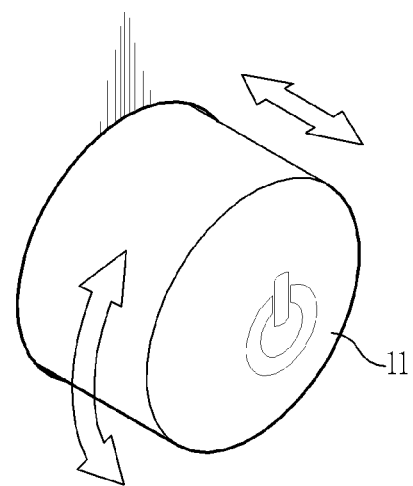
FIG. 4 is a drawing illustrating the manipulation direction of the knob in the user interface device in accordance with an embodiment of the present disclosure.

FIG. 1 is a drawing illustrating the configuration of a user interface device in accordance with an embodiment of the present disclosure. FIG. 2 is a drawing illustrating an example of the manipulation of a knob in the user interface device in accordance with an embodiment of the present disclosure. FIG. 3 is a drawing illustrating another example of the manipulation of a knob in the user interface device in accordance with an embodiment of the present disclosure. FIG. 4 is a drawing illustrating the manipulation direction of the knob in the user interface device in accordance with an embodiment of the present disclosure.

Referring to FIG. 1, a user interface device 1 includes a knob 11 and a display unit 12 that are provided at one side of a body 10 of the user interface device 1. The knob 11 may be provided adjacent to the display unit 12.

The knob 11 is provided on the body 10 to enable a pressing operation by a user.

The knob 11 is configured to implement a multistage pressing, for example, pressing into stage one, stage two, and stage three, such that the degree of the knob 11 being pressed varies with the pressing manipulation of a user. The knob 11 is configured to provide a different retraction depth according to the degree of the knob 11 pressed by a user. The retraction depth of the knob 11 may represent a value corresponding to the change in position of the knob 11 that is moved according to the pressing of a user, or a value corresponding to the change in height of the knob 11 that is moved according to the pressing of a user.

Referring to FIGS. 2 and 3, the knob 11 is configured to be buried, or retracted, at a power-off state and be ejected, or extended, at a power-on state such that the knob 11 has a maximum retraction depth at the power-off state and has a minimum retraction depth at the power-on state.

The retraction depth of the knob 11 is changed in a stepwise manner according to the degree of the knob 11 being pressed by a user.

Whenever a user presses the knob 11, the knob 11 may retain a pressed state (see FIG. 2). Alternatively, the knob 11 may be extended to the original state when the knob 11 is no longer being pressed (see FIG. 3).

The knob 11 may be pressed by a user in a multistage manner, such as in a two-stage manner, a three-stage manner, and a four-stage manner, for example.

The retraction depth of the knob 11 varies with the degree of the knob 11 being pressed by a user, and according to the retraction depth varied, a class, or an option group, transition of a function selected by a user is achieved. For example, as the retraction depth of the knob 11 is increased, an option group transition from an upper option group to a lower option group is performed, and as the retraction depth of the knob 11 is decreased, an option group transition from a lower option group to an upper option group is performed.

The display unit 12 displays a screen corresponding to the manipulation of the knob 11. In particular, when an option group transition occurs by the manipulation of the knob 11, the display unit 12 changes a current screen to a screen of an option group to which the option group transition is made. Accordingly, whenever the knob 11 is pressed in stages, a screen of an option group to which an option group transition is made is displayed on the display unit 12.

In addition, the knob 11 is provided on the body 10 to enable a rotation manipulation by a user (see FIG. 4).

The knob 11 is configured to have an angle of rotation thereof varying according to the manipulation of rotation by a user.

The knob 11 has an angle of rotation changed in stepwise according to the degree of clockwise or counterclockwise rotation of the knob 11 by a user.

The angle of rotation of the knob 11 varies with the manipulation of rotation by a user, and according to the angle of rotation, the selection of the type of a function is achieved or the selection of an attribute, or option value of each option group of the selected function is achieved.

To select the type of a function on the display unit 12, in a display state of a screen having a list of a plurality of functions, if the knob 11 is rotated, a highlighted function is consecutively changed whenever the knob 11 is rotated, so that the selecting of the type of a function is achieved.

In addition, the option group transition is achieved by the pressing operation of the knob 11, and in a state of displaying an option group screen having a plurality of option values on the display unit 12, if the knob 11 is rotated, an option value is consecutively changed whenever the knob 11 is rotated, so that the selecting of an option value is achieved.

As described above, the option group transition is achieved by the pressing operation of the knob 11, and the selecting of the type of a function or the selecting of an option value is achieved by the rotating operation of the knob 11.

A series of information selected by a user according to the pressing manipulation and the rotating manipulation of the knob 11, such as function information, option group transition information, and option information of each option group, for example, is stored in a memory.

The execution of a function is achieved when the selecting of an option value is completed on a screen of a last option group, from which an option group transition is completed by the pressing manipulation by a user. If an option group transition is made to a last option group, from which an option group transition is completed, and a selecting of an option value on the screen of the last option group is completed, the corresponding function is executed based on a series of information stored in the memory.

Figure 5:
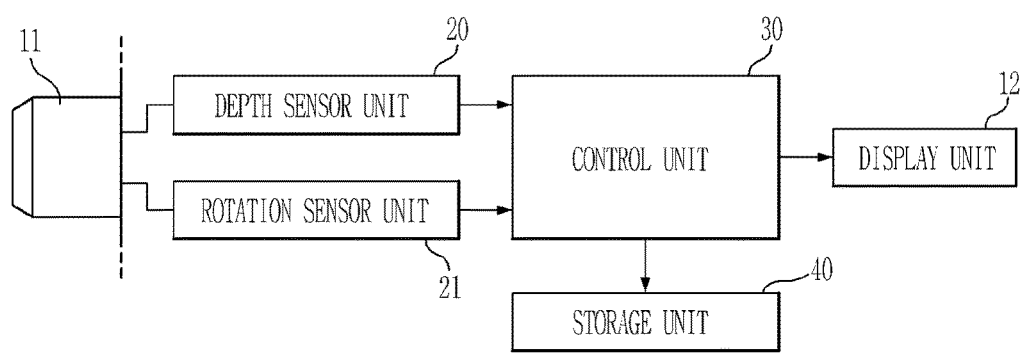
FIG. 5 is a control block diagram showing the user interface device in accordance with an embodiment of the present disclosure.

FIG. 5 is a control block diagram showing the user interface device in accordance with an embodiment of the present disclosure.

Referring to FIG. 5, the user interface device includes a depth sensor unit 20, a rotation sensor unit 21, a control unit 30, a storage unit 40, and a display unit 12.

The depth sensor unit 20 senses the depth by which the knob 11 is retracted. The depth sensor unit 20 senses the depth, by which the knob 11 is retracted, changed by the manipulation of the knob 11 by a user. The depth sensor unit 20 outputs a signal corresponding to the depth information to the control unit 30. The depth sensor unit 20 outputs a different signal if a different retraction depth is detected.

The rotation sensor unit 21 senses the angle of rotation of the knob 11. The rotation sensor unit 21 senses the angle of rotation of the knob 11 varying with the rotation of the knob 11 by the user. The rotation sensor unit 21 outputs a signal corresponding to the rotation angle information to the control unit 30. The rotation sensor unit 21 outputs a different signal if a different degree of rotation is detected.

The display unit 12 displays a screen according to the manipulation of the knob 11. The display unit 12 displays a screen and the change of a screen according to the pressing manipulation and the rotation manipulation of the knob 11.

The control unit 30 receives the signal being output from the depth sensor unit 20, and recognizes the depth information of the knob 11 based on the signal. The control unit 30 determines an option group, to which an option group transition is to be made, corresponding to the depth information recognized by the depth sensor unit 20 among a plurality of option groups of the function selected by a user, and controls the display unit 12 to display a screen of the determined option group.

In addition, the control unit 30 receives a signal being output from the rotation sensor unit 21, and recognizes the angle of rotation of the knob 11 based on the signal. In this case, the control unit 30, depending on whether a current screen is a screen to select a function type or a screen to select an option value of each option group, determines a selection value corresponding to the recognized rotation angle.

In addition, the control unit 30 stores various information, such as function information, option group transition information, and option information of each option group, for example, which are generated whenever a pressing manipulation and a rotation manipulation of the knob 11 are performed, in the storage unit 40.

In addition, the control unit 30, if it is determined that an option group transition to the last option group, from which an option group transition is completed, is performed by the pressing manipulation of a user, based on the depth information of the knob 11 sensed through the depth sensor unit 20, and determined that a selection of an option value on the last option group is completed, executes the corresponding function based on the series of information stored in the storage unit 40.

Hereinafter, a method of controlling a user interface device applied with the knob, shown in FIG. 2, which remains in a pressed state by the pressing manipulation by a user.

Figure 6A:
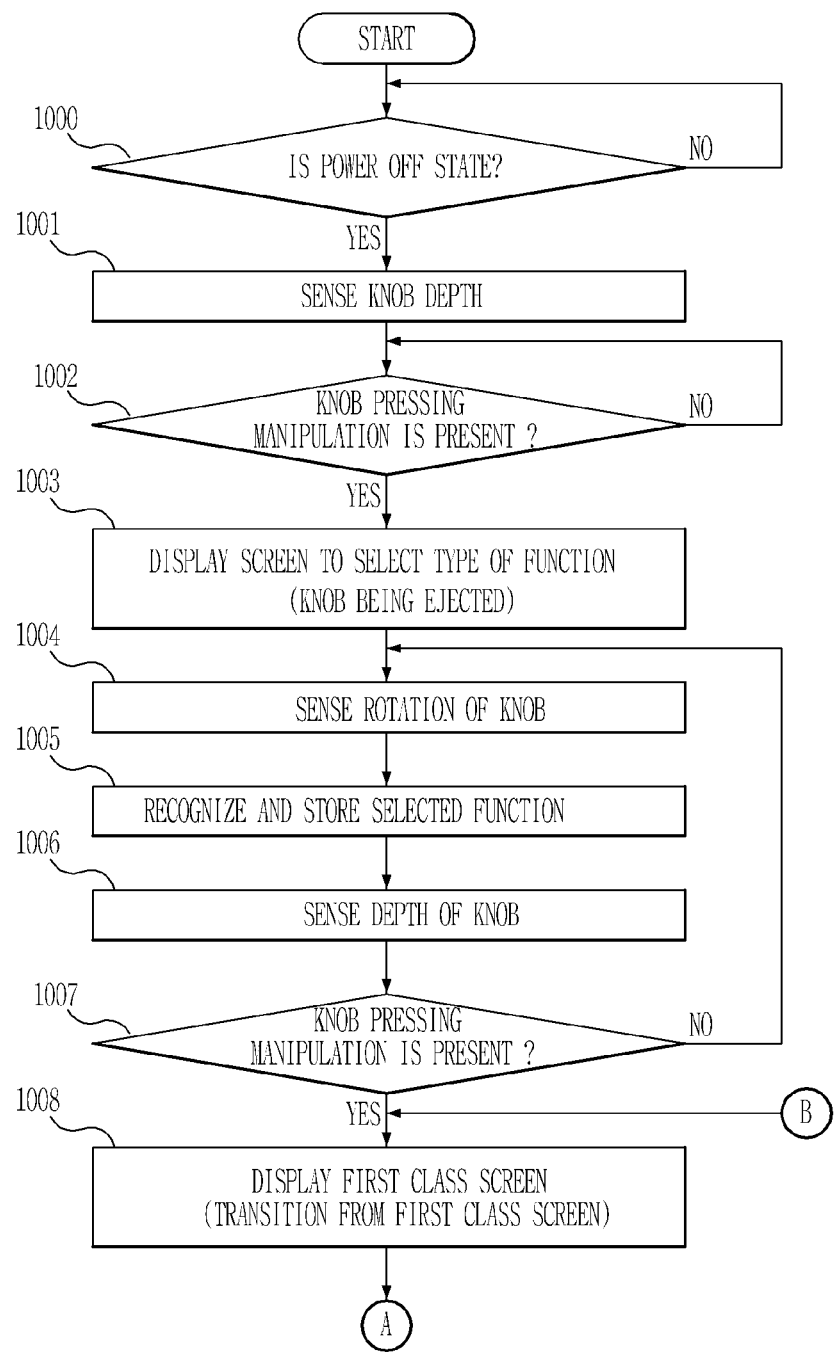
FIGS. 6A and 6B illustrate a control flow chart showing the user interface device in accordance with an embodiment of the present disclosure.
Figure 6B:
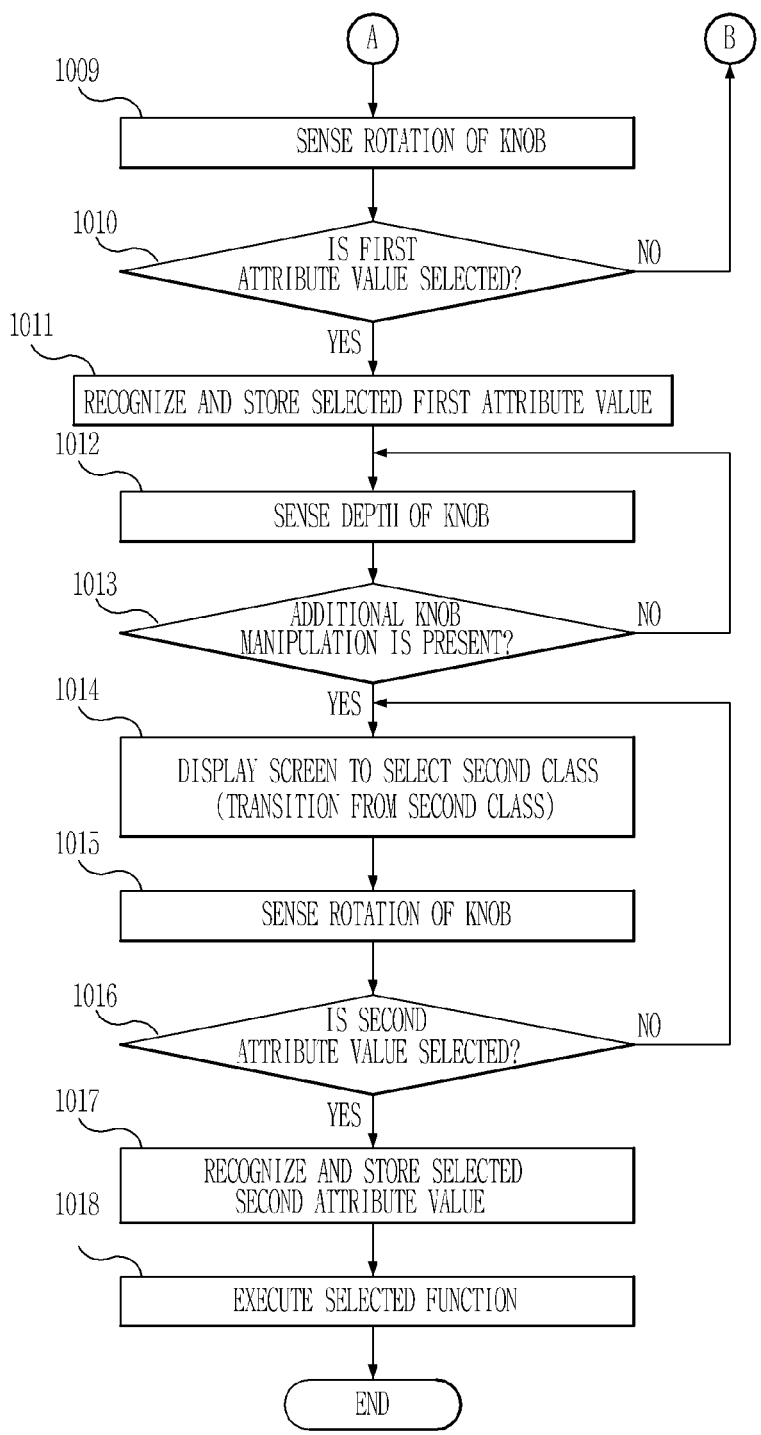

FIGS. 6A and 6B are a control flow chart showing the user interface device in accordance with an embodiment of the present disclosure.

The control unit 30 determines whether a current state is a power off state (operation 1000). If it is determined from operation 1000 that the current state is the power off state, the control unit 30 senses the depth of the knob 11 (operation 1001) and determines whether a pressing manipulation of the knob 11 is present (operation 1002).

If it is determined from operation 1002 that a pressing manipulation is present at the power off state, the control unit 30 displays a screen to select a type of function on the display unit 12 (operation 1003). Accordingly, the user selects a desired type of function among a plurality of types of functions being displayed on the screen, by rotating the knob 1. In this case, the knob 11 is extended to the maximum degree.

Thereafter, the control unit 30 senses the rotation of the knob 11 (operation 1004), recognizes the type of function selected by the rotation of the knob 11, and stores a value of the recognized function in the stored unit 40 (operation 1005).

After the function is recognized and stored, the control unit 30 senses the depth of the knob 11 (operation 1006), and determines whether a pressing manipulation of the knob 11 is present (operation 1007). The pressing manipulation represents a manipulation of the knob 11 having a retraction depth of the knob 11 at a predetermined depth according to the pressure on the knob 11. Even at the time of releasing the pressure by the user, the knob 11 retains the predetermined depth of retraction.

If it is determined from operation 1007 that a pressing manipulation of the knob 11 is present, a transition is made to a first option group corresponding to the predetermined depth that is formed by the pressing manipulation at the function recognized from the operation 1005, and a first option group screen to select a first option value of the function at the first option group is displayed on the display unit 12 (operation 1008). Accordingly, the user 11 selects a desired first option value among a plurality of first option values being displayed on the first option group screen by rotating the knob 11.

At this state, the control unit 30 senses the rotation of the knob 11 (operation 1009), and according to the result of sensing the rotation of the knob 11, determines whether the first option value is selected (operation 1010). For example, an option value being highlighted at a predetermined point of time after the first option group screen is displayed is a first option value that is selected. In this case, the first option value is an option value selected by a user among a plurality of first option values displayed on the first option group screen.

If it is determined from operation 1010 that the first option value is selected, the control unit 30 recognizes the first option value selected by the rotation of the knob, and stores the recognized first option value in the storage unit 40 (operation 1011).

After the first option value is recognized and stored, the storage unit 30 senses the depth of the knob 11 (operation 1012) to determine whether an additional pressing manipulation of the knob 11 is present (operation 1013). Because the knob 11 is in a state of being pressed by the previous operation mode, the knob 11 has a depth value increased by the additional pressing manipulation.

If it is determined from the operation 1013 that an additional pressing manipulation is present, an option group transition is made to a second option group, which corresponds to a depth that is formed by the additional pressing manipulation, at the function recognized from the operation 1005, and a second option group screen to select a second option value of the function at the second option group is displayed on the display unit 12 (operation 1014). Accordingly, the user 11 selects a desired second option value among a plurality of second option values being displayed on the second option group screen by rotating the knob 11. When assumed that the knob 11 is completely retracted by the additional pressing manipulation, the control unit 40 senses the depth of the knob 11 and recognizes an absence of an option group to which the option group transition is made, and prepares for the execution of the corresponding function.

At this state, the control unit 30 senses the rotation of the knob 11 (operation 1015), and according to the result of sensing the rotation of the knob 11, determines whether the second option value is selected (operation 1016). For example, an option value being highlighted at a predetermined point of time after the second option group screen is displayed is a second option value that is selected. In this case, the second option value is an option value selected by a user among a plurality of second option values displayed on the second option group screen.

If it is determined from operation 1016 that the second option value is selected, the control unit 30 recognizes the second option value selected by the rotation of the knob 11, and stores the recognized second option value in the storage unit 40 (operation 1017).

After the second option value is recognized and stored, the control unit 30 executes the corresponding function based on the function value, the first option value and the second option value that are stored in the storage unit 40 (operation 1018). Thereafter, as the execution of the function is completed, the user interface device 1 may automatically enter a power-off state.

Hereinafter, a method of controlling a user interface device applied with the knob, shown in FIG. 3, which is extended after being pressed by the pressing manipulation by a user.

Figure 7A:
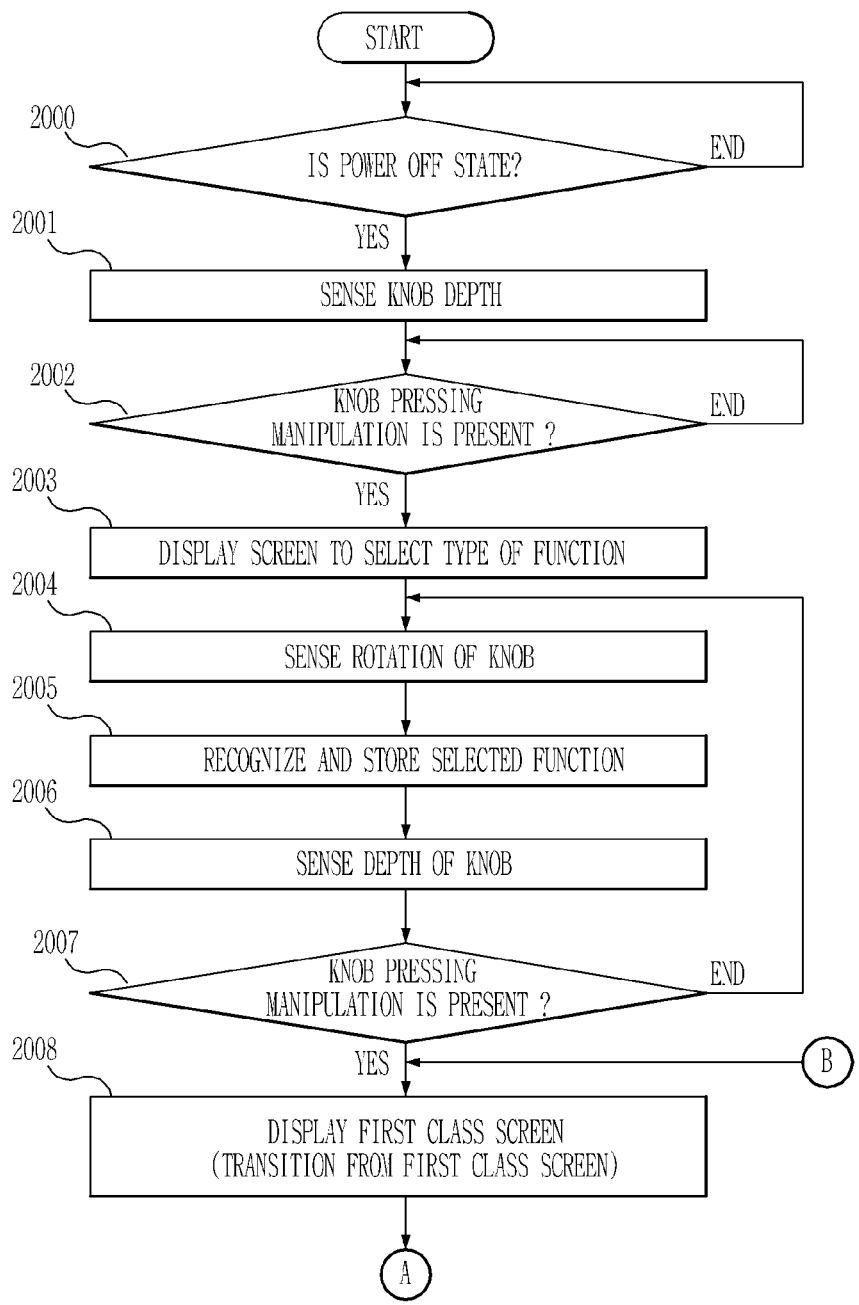
FIGS. 7A and 7B illustrate a control flow chart showing the user interface device in accordance with an embodiment of the present disclosure.
Figure 7B:
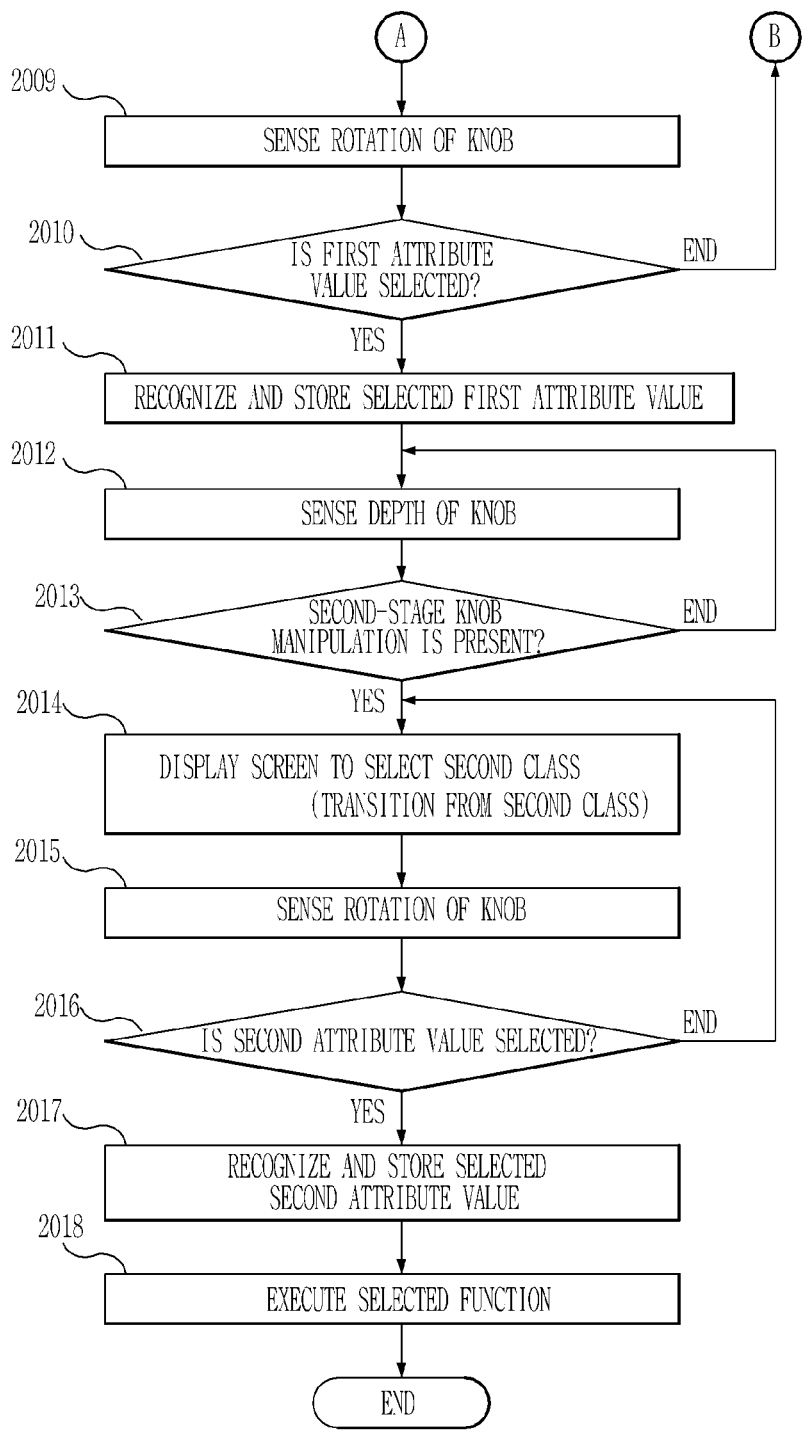

FIGS. 7A and 7B are a control flow chart showing the user interface device in accordance with an embodiment of the present disclosure.

The control unit 30 determines whether a current state is a power-off state (operation 2000). If it is determined from the operation 2000 that the current state is the power-off state, the control unit 30 senses the depth of the knob 11 (operation 2001) to determine whether a first-stage pressing manipulation of the knob 11 is present (operation 2002).

If it is determined from operation 2002 that a first-stage pressing manipulation is present at the power-off state, the control unit 30 displays a screen to select the type of a function on the display unit 12 (operation 2003). At this state, the knob 11 is extended to the maximum degree.

Thereafter, the control unit 30 senses the rotation of the knob 11 (operation 2004), recognizes the type of function selected by the rotation of the knob 11, and stores a value of the recognized function in the stored unit 40 (operation 2005).

After the function is recognized and stored, the control unit 30 senses the depth of the knob 11 (operation 2006), and determines whether the first-stage pressing manipulation of the knob 11 is present (operation 2007). The first-stage pressing manipulation represents a manipulation of the knob 11 having a retraction depth of the knob 11 at a first depth according to the pressure on the knob 11. When the pressure by the user is released, the knob 11 is extended to the original state.

If it is determined from operation 2007 that the first-stage pressing manipulation of the knob 11 is present, an option group transition is made to a first option group corresponding to the first depth that is formed by the first-stage pressing manipulation, at the function recognized from the operation 2005, and a first option group screen to select a first option value of the function at the first option group is displayed on the display unit 12 (operation 2008). Accordingly, the user 11 selects a desired first option value among a plurality of first option values being displayed on the first option group screen by rotating the knob 11.

At this state, the control unit 30 senses the rotation of the knob 11 (operation 2009), and according to the result of sensing the rotation of the knob 11, determines whether the first option value is selected (operation 2010). For example, an option value being highlighted at a predetermined point of time after the first option group screen is displayed is a first option value that is selected. In this case, the first option value is an option value selected by a user among a plurality of first option values displayed on the first option group screen.

If it is determined from operation 2010 that the first option value is selected, the control unit 30 recognizes the first option value selected by the rotation of the knob 11, and stores the recognized first option value in the storage unit 40 (operation 2011).

After the first option value is recognized and stored, the storage unit 30 senses the depth of the knob 11 (operation 2012) and determines whether a second-stage pressing manipulation of the knob 11 is present (operation 2013). The second-stage pressing manipulation represents a manipulation of the knob 11 having a retraction depth of the knob 11 at a second depth according to the pressure on the knob 11.

If it is determined from operation 2013 that the second-stage pressing manipulation is present, an option group transition is made to a second option group, which corresponds to the second depth that is formed by the second-stage pressing manipulation, at the function recognized from the operation 2005, and a second option group screen to select a second option value of the function at the second option group is displayed on the display unit 12 (operation 2014). Accordingly, the user 11 selects a desired second option value among a plurality of second option values being displayed on the second option group screen by rotating the knob 11. When assumed that the knob 11 is completely retracted by the second-stage pressing manipulation, the control unit 40 recognizes the absence of an option group to which a transition is made by sensing the depth of the knob 11, and prepares for execution of the corresponding function.

At this state, the control unit 30 senses the rotation of the knob 11 (operation 2015), and according to the result of sensing the rotation of the knob 11, determines whether the second option value is selected (operation 2016). For example, an option value being highlighted at a predetermined point of time after the second option group screen is displayed is a second option value that is selected. In this case, the second option value is an option value selected by a user among a plurality of option values displayed on the second option group screen.

If it is determined from operation 2016 that the second option value is selected, the control unit 30 recognizes the second option value selected by the rotation of the knob 11, and stores the recognized second option value in the storage unit 40 (operation 2017).

After the second option value is recognized and stored, the control unit 30 executes the corresponding function based on the function value, the first option value and the second option value that are stored in the storage unit 40 (operation 2018). Thereafter, as the execution of the function is completed, the user interface device 1 may automatically enter the power-off state.

Figure 8:
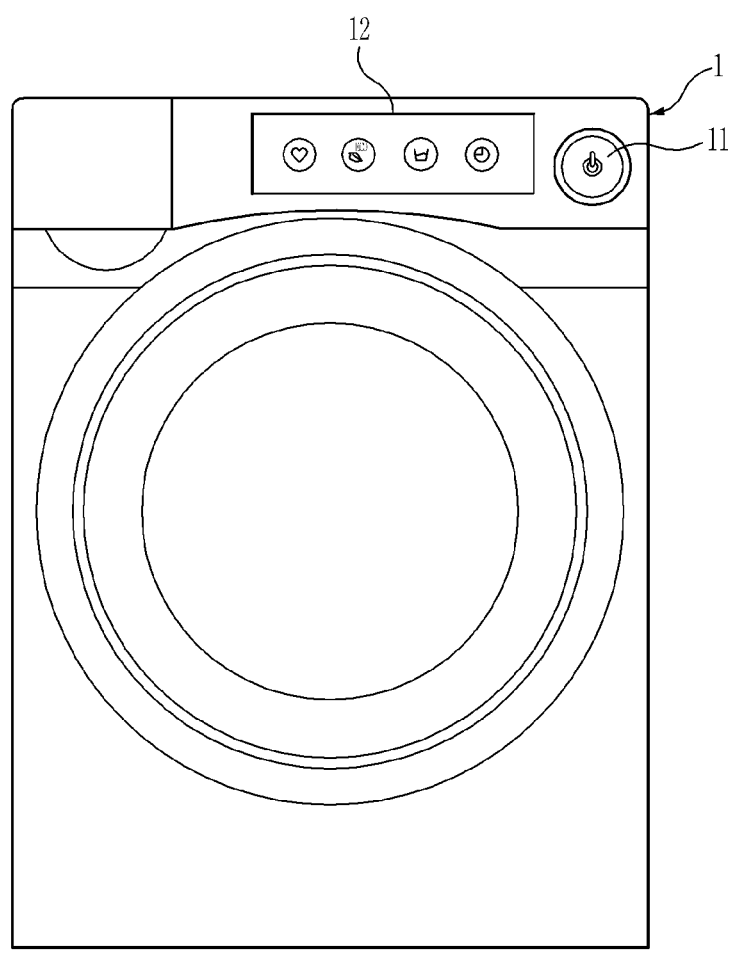
FIG. 8 is a diagram illustrating the configuration of a washing machine applied with the user interface device in accordance with an embodiment of the present disclosure.
Figure 9:
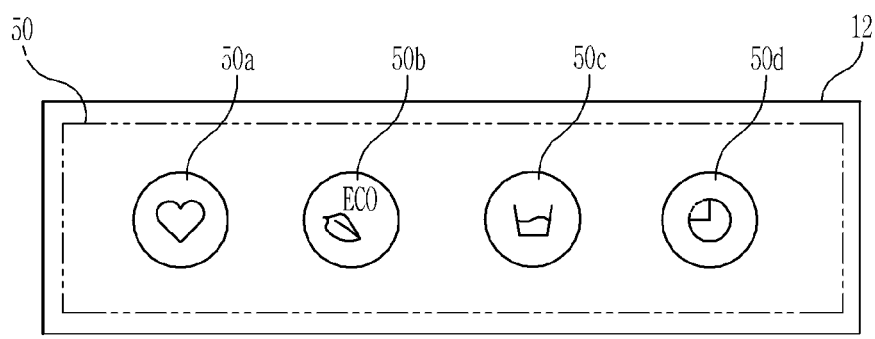
FIGS. 9 to 11 are diagrams illustrating screens by classes, or option groups, according to the pressing operation in the washing machine applied with the user interface device in accordance with an embodiment of the present disclosure.
Figure 10:
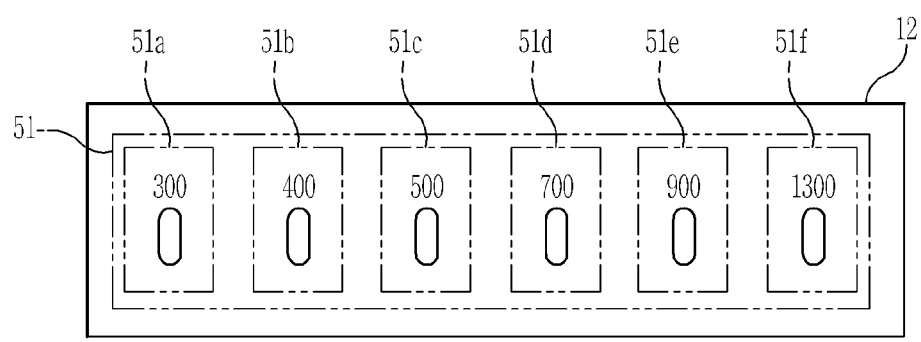
Figure 11:
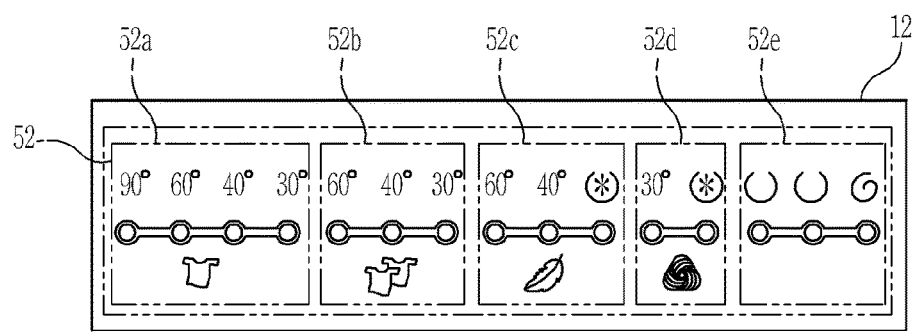

FIG. 8 is a diagram illustrating the configuration of a washing machine provided with the user interface device in accordance with an embodiment of the present disclosure. FIGS. 9 to 11 are diagrams illustrating screens by option groups according to the pressing operation of a user in the washing machine applied with the user interface device in accordance with an embodiment of the present disclosure.

Referring to FIG. 8, the user interface device 1 includes the knob 11 configured to be pressed and rotated for the operation of a washing machine, and a display unit 12 to display a setting screen of the washing machine according to the manipulation of the knob 11.

Referring to FIG. 9, the display unit 12 displays a screen 50 having a function icon list representing the types of functions of the washing machine.

For example, the function icon list includes a favorite icon 50a, an eco icon 50b, a wash cycle icon 50c, and a wash delay icon 50d. However, the disclosure is not limited to the display described above.

Referring to FIGS. 10 and 11, for example, an eco function corresponding to the eco icon 50b includes a first option group and a second option group that are subsequent in order. As the option group transitions occur, screens 51 and 52 are sequentially displayed by option groups on the display unit 12.

The first option group screen 51 of the eco icon 50b has option group icons, which are configured to select the spin dry speed, such as "300" 51a, "400" 51b, "500" 51c, "700" 51d, "900" 51e, and "1300" 51f, displayed to enable a selection by a user (see FIG. 10).

In addition, the second option group 52 of the eco icon 50b has option group icons, which are configured to select the type of laundry and the temperature of washing operation, such as normal clothes 52a, color clothes 52b, feather clothes 52c, wool clothes 52d, and agitation 52e, displayed to enable a selection by a user (see FIG. 11).

Figure 12:
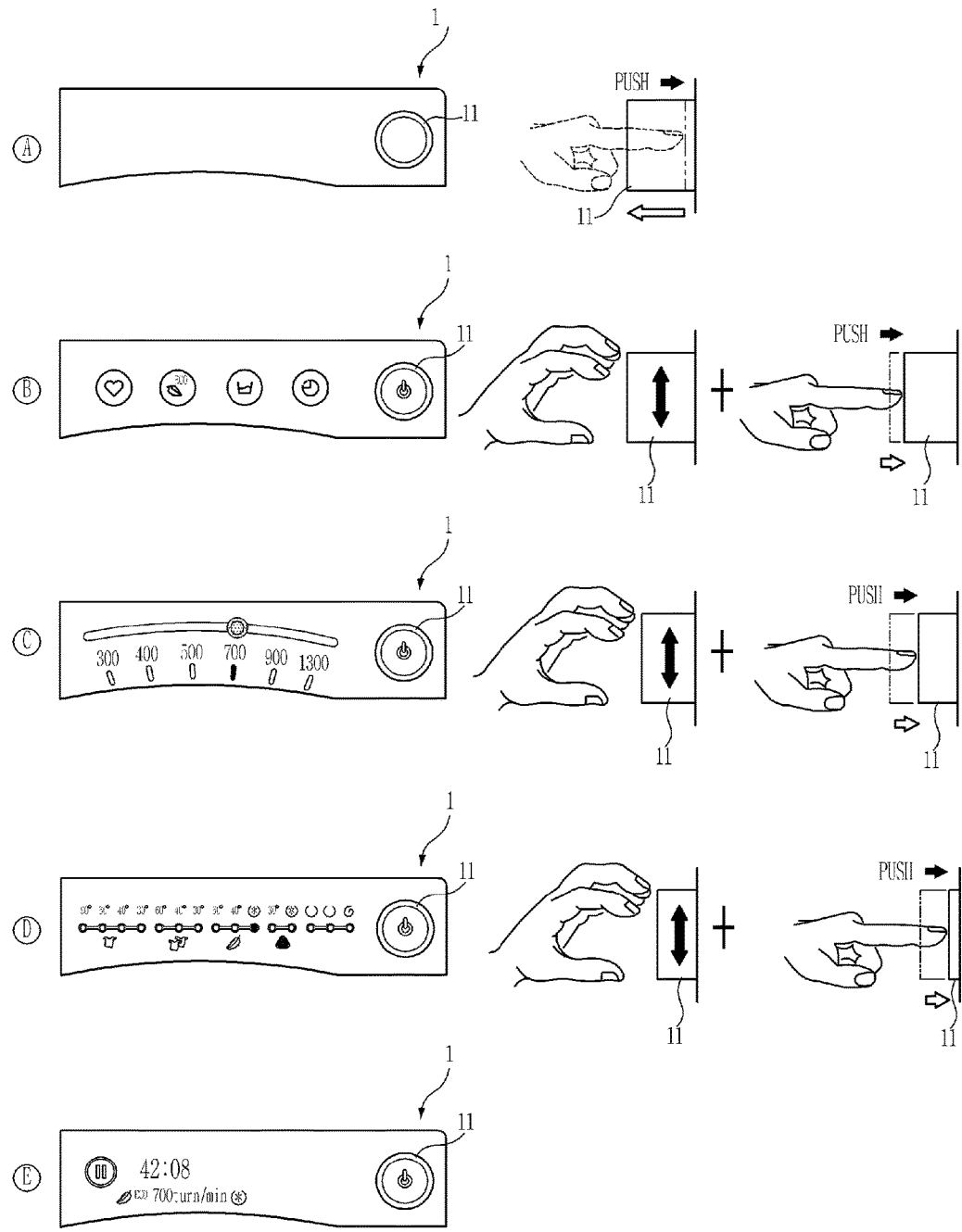
FIG. 12 is a drawing illustrating a user interface in the washing machine applied with the user interface device in accordance with an embodiment of the present disclosure.

FIG. 12 is a drawing illustrating a user interface in the washing machine applied with the user interface device in accordance with an embodiment of the present disclosure.

Referring to FIG. 12, in a power-off state of the washing machine, the user interface device 1 of the washing machine has the knob 11 retracted from the front surface of the body 10 of the user interface device 1.

If a user presses the knob 11 to operate the washing machine, the knob 11 is extended to the front surface from being retracted in the body 10. According to the change of depth of the knob 11 generated when the knob 11 retracted in the front surface of the body is extended, the washing machine is powered on.

At the same time when the knob 11 is extended from the front surface of the body, the screen 50 having the favorite icon 50a, the eco icon 50b, the wash cycle icon 50c, and the wash delay icon 50d is displayed on the display unit 12 such that the type of function is selected.

For example, in the beginning, the favorite icon 50a may be highlighted, and if a user rotates the knob 11 clockwise, the highlight of the favorite icon 50a is turned off and the eco icon 50b located at the right side of the favorite icon 50a is highlighted. Accordingly, the user is informed that the eco icon is selected.

If a user rotates the knob 11 clockwise to locate the knob 11 at the eco icon 50b in order to set an eco function and then presses the knob 11 by one stage, the first option group screen 51 having the spin dry icons including "300" 51a, "400" 51b, "500" 51c, "700" 51d, "900" 51e, and "1300" 51f are displayed on the display unit 12 such that the spin dry is selected. In this case, the knob 11 is in a state of being pressed by one stage.

For example, in the beginning, the spin dry speed "500" 51c may be highlighted, and if a user rotates the knob 11 clockwise, the spin dry speed "700" 51d located at the right side of the spin dry speed "500" 51c is highlighted. Accordingly, the user is informed that the spin dry speed "700" 51d is selected.

If a user rotates the knob 11 clockwise to locate the knob 11 at the spin dry speed "700" 51d in order to set the spin dry speed and then additionally presses the knob 11 by one stage, the screen 52 to select the type of laundry and the temperature of the washing operation is displayed on the display unit 12. The screen 52 displays various icons 52a to 52d indicating types of laundry/temperatures of a washing operation. In this case, the knob 11 is in a state of being pressed by two stages.

The user selects an icon, which corresponds to a desired type of laundry and a desired temperature of washing operation, by rotating the knob 11 clockwise. For example, a user rotates the knob 11 clockwise to highlight "feather/cold water" 52c located as a second icon to the right side of "color clothes/40 degrees" 52a that is originally highlighted.

If the user additionally presses the knob 11 by one stage after locating the knob 11 at an icon corresponding to a desired type of laundry and a desired temperature of washing operation by rotating the knob 11, a screen summarizing the selection of the total wash time, the information about the type of function, the information about spin dry speed, and the information about the type of laundry/the temperature of laundry is displayed on the display unit 12. For example, "42 mins: 8 secs" representing the total wash time, an eco function icon indicating an eco function, "700 turn/min" indicating the spin dry speed, and an icon corresponding the type of laundry/the temperature of washing operation are displayed. In this case, the option group pressed by the user is the last option group from which the knob 11 is not pressed any further, and the knob 11 is retracted to the maximum degree while being pressed by three stages.

At the same time when various types of information are displayed, the eco function is executed.

If a user desires to temporarily stop the washing machine while executing the function, the user may temporarily stop the washing machine by pressing the knob 11. In this case, a releasing of the temporary stop may be achieved by pressing the knob 11 again.

Although the execution of the function is illustrated as being automatically achieved by the selecting of the option value at the last option group screen, the present disclosure is not limited thereto. Alternatively, as to execute the function, the knob 11 may be configured to be pressed one more time in the end. For example, the knob 11 may be configured to be pressed in four stages, and the knob 11, in a state of being pressed by three stages, is further pressed by one stage to a stage four, so that the function may be executed. In this case, the knob 11 is retracted as being pressed by four stages. However, the disclosure is not limited to the described stages above, and any number of stages may be used as appropriate for a function of a device.

Figure 13:
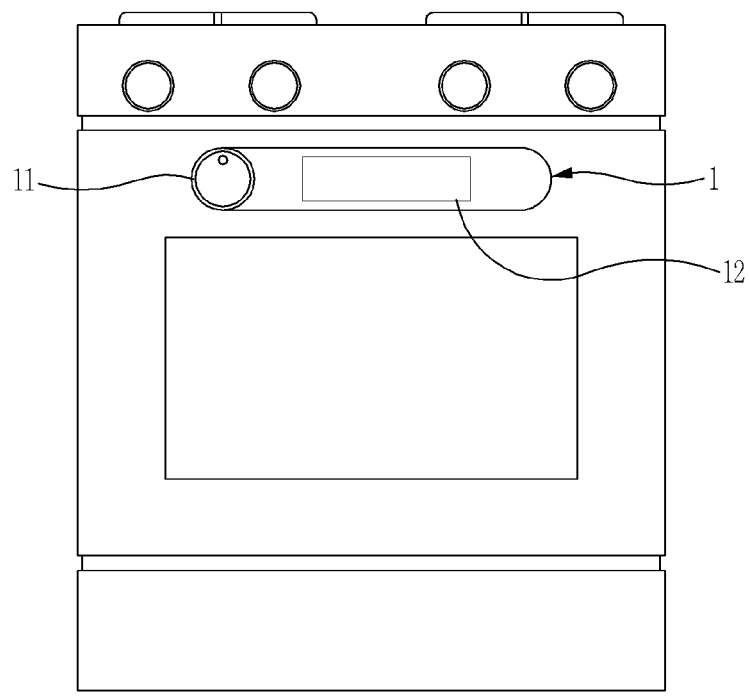
FIG. 13 is a drawing illustrating an oven applied with the user interface device in accordance with an embodiment of the present disclosure.
Figure 14:
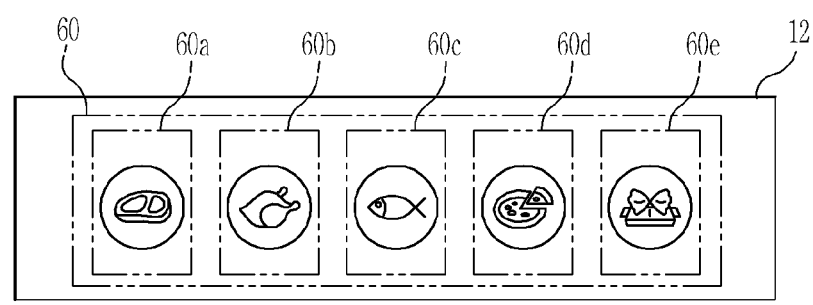
FIGS. 14 to 16 are diagrams illustrating screens by classes, or option groups, according to the pressing operation in the oven applied with the user interface device in accordance with an embodiment of the present disclosure.
Figure 15:
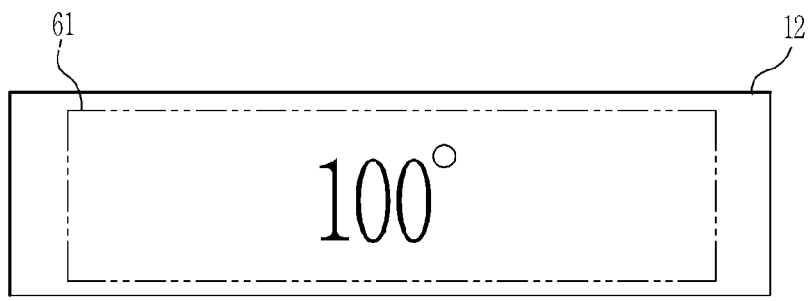
Figure 16:
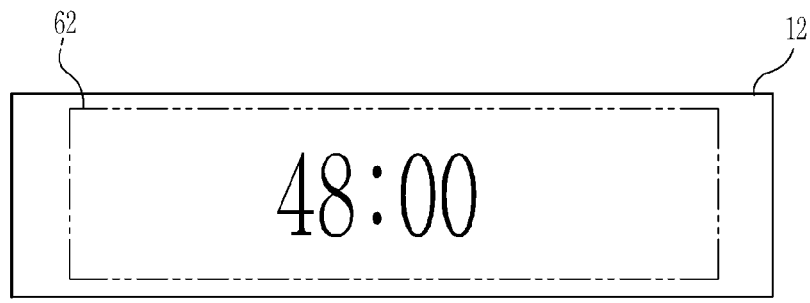

FIG. 13 is a drawing illustrating an oven applied with the user interface device in accordance with an embodiment of the present disclosure. FIGS. 14 to 16 are diagrams illustrating screens with option groups according to a user's pressing operation in the oven applied with the user interface device in accordance with an embodiment of the present disclosure.

Referring to FIG. 13, the user interface device 1 includes the knob 11 configured to be pressed and rotated for the operation of an oven, and a display unit 12 to display a setting screen of the oven according to the manipulation of the knob 11.

Referring to FIG. 14, the display unit 12 displays a screen 60 having a function icon list representing the type of functions of the oven.

The function icon list includes a meat icon 60a, a poultry icon 60b, a fish icon 60c, a pizza icon 60d, and a cookie icon 60e.

Referring to FIGS. 15 and 16, for example, a fish cooking function corresponding to the fish icon 60c includes a first option group and a second option group that are subsequent in order. As the option group transitions occur, screens 61 and 62 by option groups are sequentially displayed on the display unit 12.

The first option group screen 61 of the fish icon 60c is a screen to set the temperature of cooking.

In addition, the second option group screen 62 of the fish icon 60c is a screen to set the time duration for cooking. However, the disclosure is not limited to the above option group screens, and additional or fewer option group screens may be provide as appropriate.

Figure 17:
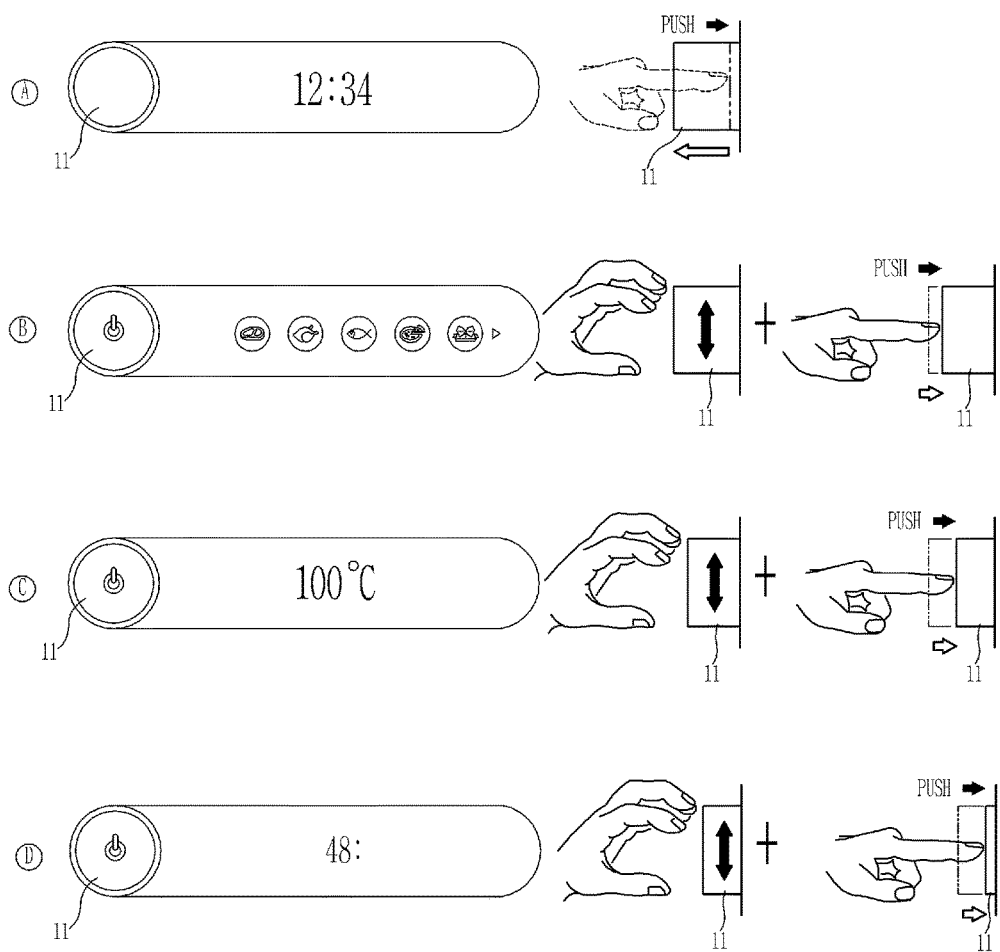
FIG. 17 is a drawing illustrating a user interface in the oven applied with the user interface device in accordance with an embodiment of the present disclosure.

FIG. 17 is a drawing illustrating a user interface in the oven applied with the user interface device in accordance with an embodiment of the present disclosure.

Referring to FIG. 17, in a power-off state of the oven, the user interface device 1 of the oven has the knob 11 retracted from the front surface of the body 10 of the user interface device 1. In this example, the display provides a current time of day in the power-off state, for a user's convenience.

If a user presses the knob 11 to operate the oven, the knob 11 is extended to the front surface from being retracted in the body 10. According to the change of depth of the knob 11 generated when the knob 11 retracted in the front surface of the body is extended, the oven is powered on.

When the knob 11 is extended from the front surface of the body 10 to the maximum degree, the screen 60 having the meat icon 60a, the poultry icon 60b, the fish icon 60c, the pizza icon 60d, and the cookie icon 60e is displayed on the display unit 12.

For example, in the beginning, the poultry icon 60b may be highlighted, and if a user rotates the knob 11 clockwise, the highlight of the poultry icon 60b is turned off and the fish icon 60c located at the right side of the poultry icon 60b is highlighted. Accordingly, the user is informed that the fish icon is selected.

If a user rotates the knob 11 clockwise to locate the knob 11 at the fish icon 60c in order to set a fish cooking function and then presses the knob 11 by one stage, the first option group screen 61 to set the temperature for cooking is displayed on the display unit 12. In this case, the knob 11 is in a state of being pressed by one stage.

For example, in the beginning, a standard temperature may be indicated, and a desired temperature of cooking may be set in a manner that the user rotates the knob 11 clockwise such that the standard temperature increases or decreases. In this case, the standard temperature may be a recommended temperature suitable for cooking fish.

If a user rotates the knob 11 clockwise or counterclockwise to select a desired temperature "100° C." for cooking, and then additionally presses the knob 11 by one stage to set the time period for cooking fish, the screen 62 to select the time period for cooking is displayed on the display unit 12. In this case, the knob 11 is in a state of being pressed by two stages.

The user selects a desired time period for cooking by rotating the knob 11. For example, in the beginning, a standard time period may be indicated, and a desired time period for cooking may be set in a manner that the user rotates the knob 11 clockwise or counterclockwise such that the standard time period increases or decreases. In this case, the standard time period may be a recommended time suitable for cooking fish.

If the user additionally presses the knob 11 by one stage after selecting a desired time period for cooking by rotating the knob 11, a screen summarizing the selection of the information about the selected type of cooking and the selected time period for cooking is displayed on the display unit 12. For example, a "fish icon" and "48 min" are displayed. In this case, the option group pressed by the user is the last option group from which the knob 11 is not pressed any further, and the knob 11 is retracted to the maximum degree while being pressed by three stages.

At the same time when various types of information are displayed on the display unit 12, the fish cooking function is executed.

Although the execution of the function is illustrated as being automatically achieved by the selecting of the option value at the last option group screen, the present disclosure is not limited thereto. Alternatively, as to execute the function, the knob 11 may be configured to be pressed one more time in the end. For example, the knob 11 may configured to be pressed in four stages, and the knob 11, in a state of being pressed by three stages, is further pressed by one stage to a stage four, so that the function may be executed. In this case, the knob 11 is retracted as being pressed by four stages.

Figure 18:
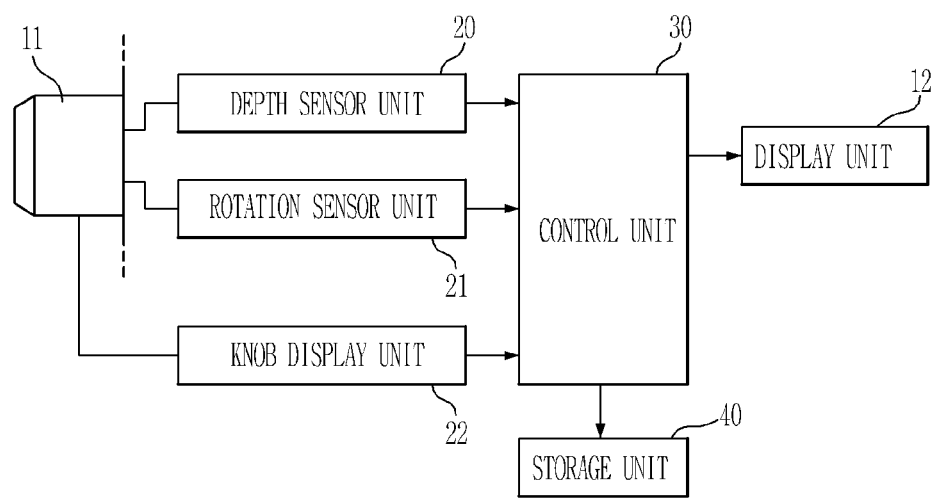
FIG. 18 is a control block diagram of a user interface device in accordance with an embodiment of the present disclosure.
Figure 19:
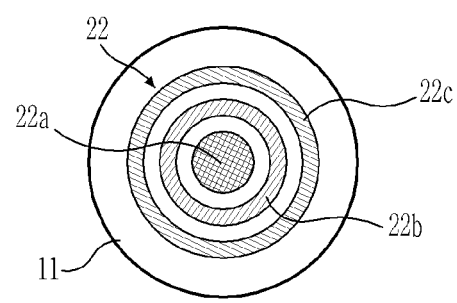
FIG. 19 is a drawing illustrating a knob display unit of the user interface device in accordance with an embodiment of the present disclosure.
Figure 20:
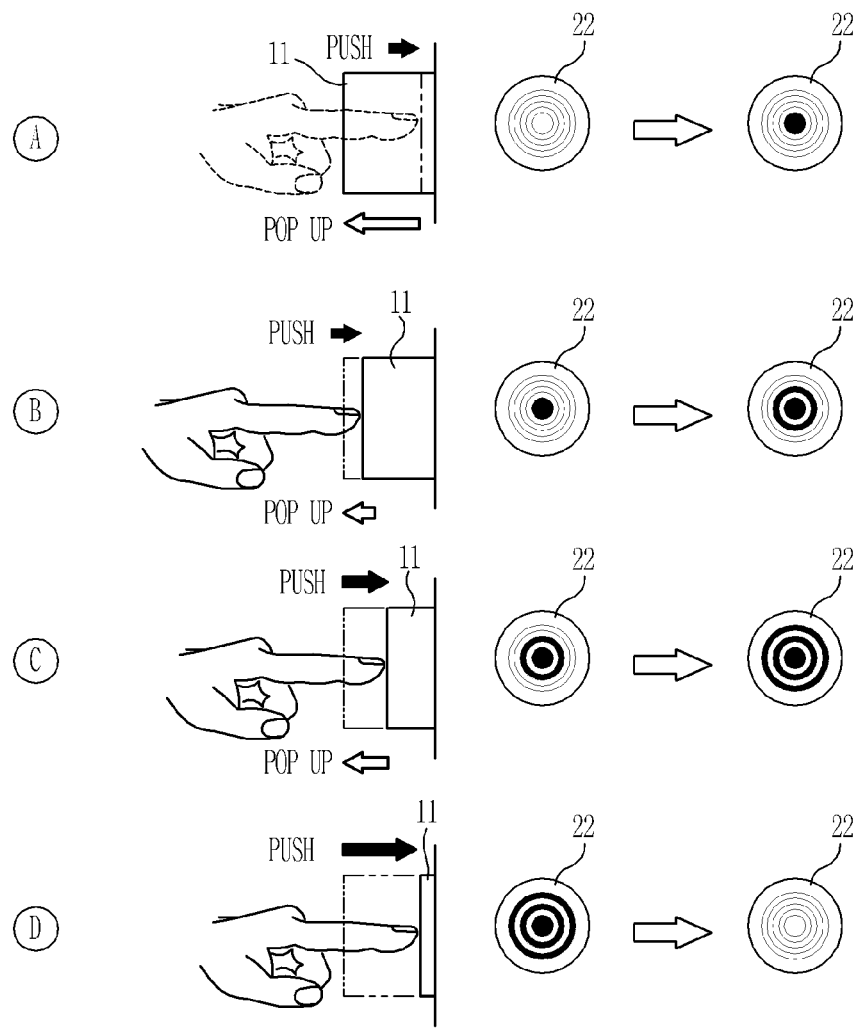
FIG. 20 is a drawing illustrating the stepwise change of display at the knob according to the operation of the knob in the user interface device in accordance with an embodiment of the present disclosure.

FIG. 18 is a control block diagram of a user interface device in accordance with an embodiment of the present disclosure. FIG. 19 is a drawing illustrating a knob display unit of the user interface device in accordance with an embodiment of the present disclosure. FIG. 20 is a drawing illustrating the stepwise change of display at the knob according to the operation of the knob in the user interface device in accordance with an embodiment of the present disclosure.

Referring to FIG. 18, the user interface device includes a depth sensor unit 20, a rotation sensor unit 21, a knob display unit 22, a control unit 30, a storage unit 40, and a display unit 12.

The depth sensor unit 20 senses the retraction depth of the knob 11 that varies according to the manipulation of the knob 11 by a user.

The rotation sensor unit 21 senses the angle of rotation of the knob 11 that varies according to the rotation of the knob 11 by a user.

The knob display unit 12 may be integrally formed with the knob 11, or provided on the knob 11.

The knob display unit 12 displays the change of the lamps lit by respective depths of the knob 11 according to the manipulation of the knob 11.

Referring to FIG. 19, for example, the knob display unit 12 may include a plurality of lamps 22a, 22b, and 22c having concentric circles.

Referring to FIG. 20, the knob display unit 12 turns on the first lamp 22a when the knob 11 is extended to the maximum degree, and at the first depth, turns on the first lamp 22a and the second lamp 22b, and at the second depth, turns on the first, second, and third lamps 22a, 22b, and 22c. In this case, the knob 11 is provided in the form of a knob that has a depth varying according to the pressing manipulation by a user, and at the time of releasing the press, is extended to the original state. In addition, the knob 11 may be a knob that is retracted when the knob is pressed by the user, and is maintained in a state of being retracted when the pressing is released.

Referring again to FIG. 18, the display unit 12 displays a screen according to the manipulation of the knob 11. The display unit 12 displays a screen and the change of a screen according to the pressing manipulation and the rotation manipulation of the knob 11.

The control unit 30 receives a signal being output from the depth sensor unit 20, and recognizes the depth information of the knob 11 based on the signal. The control unit 30 determines an option group, to which an option group transition is made, corresponding to the depth information recognized through the depth sensor unit 20 among a plurality of option groups of the function selected by a user, and controls the display unit 12 to display a screen of the determined option group.

In addition, the control unit 30 receives a signal being output from the rotation sensor unit, and recognizes the degree of rotation of the knob 11 based on the signal. In this case, the control unit 30, depending on whether a current screen is a screen to select a function type or a screen to select an option value of each option group, determines a selection value corresponding to the recognized rotation angle.

In addition, the control unit 30 stores various information, such as function information, option group transition information, and option information of each option group, for example, which is generated whenever a pressing manipulation and a rotation manipulation of the knob 11 are performed, in the storage unit 40.

In addition, the control unit 30, if it is determined that an option group transition to the last option group, from which an option group transition is completed, is performed by the pressing manipulation of a user based on the depth information of the knob 11 sensed through the depth sensor unit 20, and determined that a selecting of an option value on the last option group is completed, executes the corresponding function based on the series of information stored in the storage unit 40.

Meanwhile, the control unit 30 sequentially lights the lamps 22a, 22b, and 22c of the knob display unit 22 according to the depth information of the knob 11 sensed through the depth sensor unit 20. For example, when the knob 11 is extended to the maximum degree, the control unit 30 turns on only the first lamp 22a, and at the first depth, turns on the first lamp 22a and the second lamp 22b, and at the second depth, turns on the first, second, and third lamps 22a, 22b, and 22c.

Although the knob display unit in accordance with an embodiment of the present disclosure is illustrated as including a plurality of lamps 22a, 22b, and 22c having concentric circles and as indicating the change of the lamps lit by respective depths of the knob according to the manipulation of the knob 11, the present disclosure is not limited thereto. The knob display unit 22 may display a screen of a function and an option group screen of the function according to the manipulation of the knob 11 in place of the display unit 22.

Hereinafter, a method of controlling a user interface device applied with a knob, which is integrally formed with a knob display unit configured to display a screen of a function and an option group screen of the function, will be described.

Figure 21:
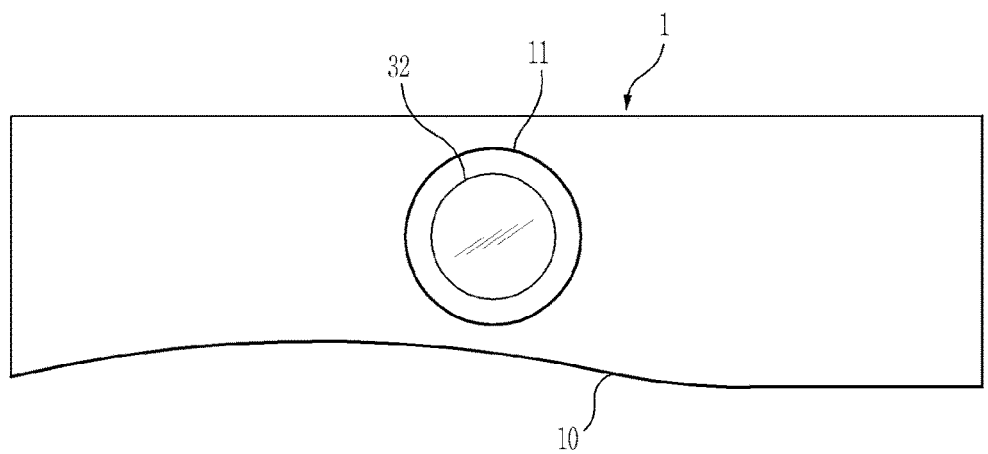
FIG. 21 is a drawing illustrating the configuration of a user interface device in accordance with an embodiment of the present disclosure.
Figure 22:
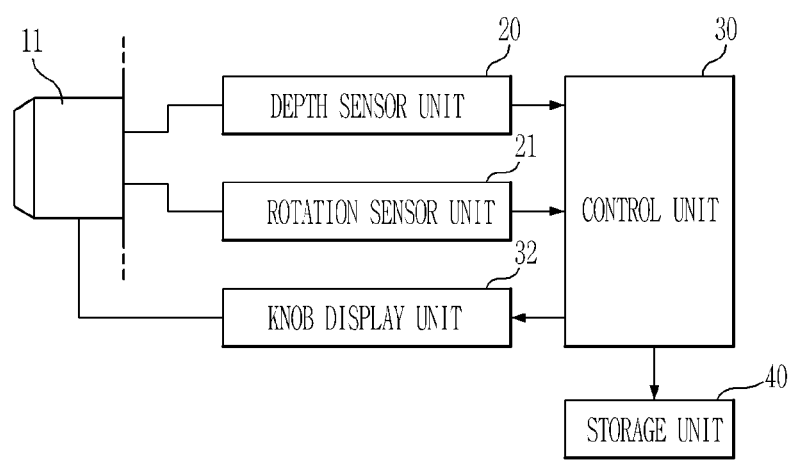
FIG. 22 is a control block diagram of the user interface device in accordance with an embodiment of the present disclosure.

FIG. 21 is a drawing illustrating the configuration of a user interface device in accordance with an embodiment of the present disclosure. FIG. 22 is a control block diagram of the user interface device in accordance with an embodiment of the present disclosure.

Referring to FIGS. 21 and 22, the user interface device 1 includes a knob 11 provided at one side of a body 10, and a knob display unit 32 integrally formed with the knob 11 at an interior portion of the knob 11.

The knob 11 is configured to enable a pressing manipulation and a rotating manipulation.

The knob display unit 32 is installed at the center of the knob 11, and displays a screen according to the manipulation of the knob 11. The knob display unit 32 displays a screen corresponding to the pressing manipulation and a rotation manipulation of the knob 11.

The control unit 30, if a pressing manipulation of the knob 11 is present, determines an option group, to which an option group transition is made, corresponding to the depth information recognized through the depth sensor unit 20 among a plurality of option groups of the function selected by a user, and controls the display unit 32 to display a screen of the determined option group.

In addition, the control unit 30, if a rotation manipulation of the knob 11 is present, determines a selection value corresponding to the recognized rotation angle by the rotation sensor unit 21, depending on whether a current screen is a screen to select a function type or a screen to select an option value of each option group.

In addition, the control unit 30 stores various information, such as function information, option group transition information, and option information of each option group, for example, which is generated whenever a pressing manipulation and a rotation manipulation of the knob 11 are performed, in the storage unit 40.

In addition, the control unit 30, if it is determined that an option group transition to the last option group, from which an option group transition is completed, is performed by the pressing manipulation of a user based on the depth information of the knob 11 sensed through the depth sensor unit 20, and determined that a selecting of an option value on the last option group is completed, executes the corresponding function based on the series of information stored in the storage unit 40.

Hereinafter, a user interface device having a knob integrated with a knob touch screen unit to display a screen of a function and an option group screen of the function according to a touch manipulation by a user will be described.

Figure 23:
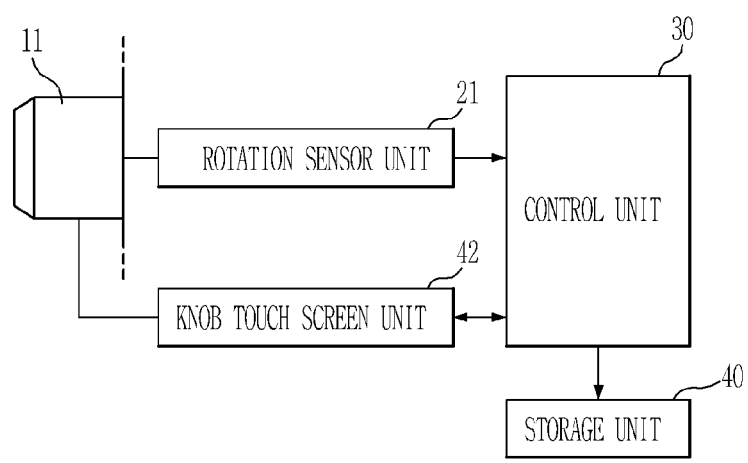
FIG. 23 is a control block diagram of a user interface device in accordance with an embodiment of the present disclosure.

FIG. 23 is a control block diagram of a user interface device in accordance with a fourth embodiment of the present disclosure.

Referring to FIG. 23, a user interface device 1 includes a rotation sensor unit 21, a knob touch screen unit 42, a control unit 30, and a storage unit 40.

A knob 11 is configured to enable a rotating manipulation.

The rotation sensor unit 21 senses the angle of rotation of the knob 11 that varies as a user rotates the knob 11.

The knob touch screen unit 42 is integrally formed with the knob 11 at the inside of the knob 11.

The knob touch screen unit 42 is provided to enable a touch operation by a user, and displays a screen according to the touch manipulation by a user.

The control unit 30 receives a touch signal by a user through the knob touch screen unit 42, determines an option group, to which an option group transition is made, corresponding to the touch signal input by the user, and controls the knob touch screen unit 42 to display a screen of the determined option group.

In addition, the control unit 30, depending on whether a current screen is a screen to select a function type or a screen to select an option value of each option group, determines a selection value corresponding to the recognized rotation angle sensed through the rotation sensor unit 21.

In addition, the control unit 30 stores various information, i.e., function information, option group transition information, and option information of each option group, which are generated whenever a touch manipulation of the knob touch screen unit 42 and a rotation manipulation of the knob 11 are performed, in the storage unit 40.

In addition, the control unit 30, if a selecting of an option value on the last option group of the knob touch screen unit 42 is completed or a touch is made for the execution on the last screen, executes the corresponding function based on the series of information stored in the storage unit 40.

Meanwhile, because the knob touch screen unit 42 is integrally formed with the knob 11, an erroneous operation may occur at the manipulation of the knob 11. In order to prevent such an erroneous operation, the knob touch screen unit 42 may be automatically locked if an input does not occur for approximately three seconds, for example, and may be released from the locking if a random position on the knob touch screen unit 42 is pressed for approximately three seconds or more, or example.

Hereinafter, a user interface device having a knob integrated with a button, which is configured to enable a pressing manipulation by a user, will be described.

Figure 24:
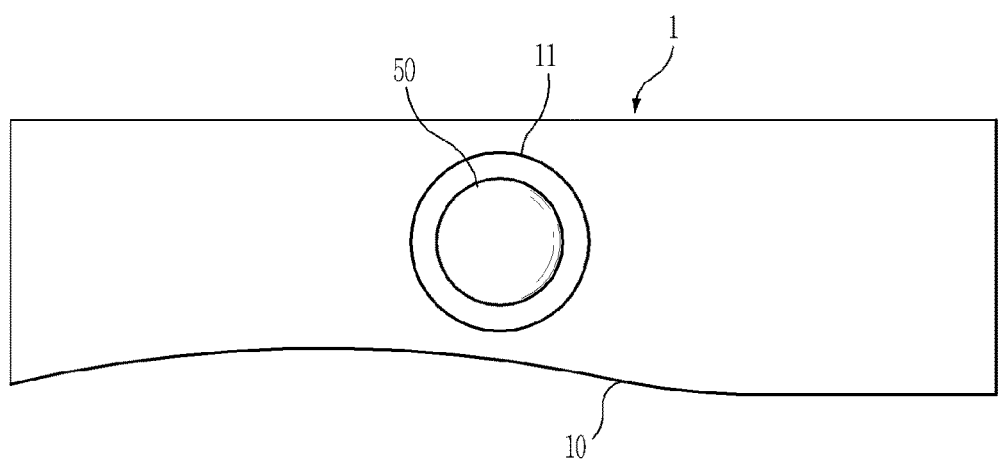
FIG. 24 is a drawing illustrating the configuration of a user interface device in accordance with an embodiment of the present disclosure.

FIG. 24 is a drawing illustrating the configuration of a user interface device in accordance with an embodiment of the present disclosure.

Referring to FIG. 24, a user interface device 1 includes a knob 11 provided at one side of a body 10, and a button unit 50 integrally formed with the knob 11 at the inside of the knob 11.

The knob 11 is configured to enable a pressing manipulation and a rotation manipulation.

The button unit 50 is installed at the center of the knob 11, and outputs a signal according to the button manipulation by a user.

Figure 25:
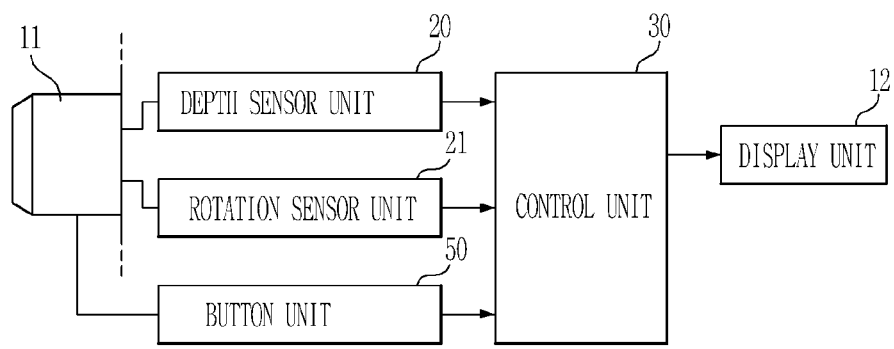
FIG. 25 is a control block diagram of the user interface device in accordance with an embodiment of the present disclosure.

FIG. 25 is a control block diagram of the user interface device in accordance with an embodiment of the present disclosure.

Referring to FIG. 25, the user interface device 1 includes a depth sensor unit 20, a rotation sensor unit 21, a button unit 50, a control unit 30, a storage unit (not shown), and a display unit 12.

The control unit 30, if a pressing manipulation of the knob 11 is present, determines an option group, to which an option group transition is made, corresponding to the depth information of the knob 11 sensed through the depth sensor unit 20 among a plurality of option groups of the function selected by a user, and controls the display unit 12 to display a screen of the determined option group.

In addition, the control unit 30, if a rotation manipulation of the knob 11 is present, determines a selection value corresponding to the recognized rotation angle recognized through the rotation sensor unit 21, depending on whether a current screen is a screen to select a function type or a screen to select an option value of each option group.

In addition, the control unit 30 stores various information, such as function information, option group transition information, and option information of each option group, for example, which are generated whenever a touch manipulation and a rotation manipulation of the knob 11 are performed, in the storage unit 40.

After the selecting of the option value on the screen of the last option group, a user presses the button unit 50 to execute the function. The control unit 30, if the button unit 50 is pressed, executes the corresponding function based on the series of information stored in the storage unit 40.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A user interface device to set and control a function of an electronic apparatus, the user interface device comprising:
    a body;
    a display unit configured to display screens by option groups of the function;
    a knob configured to rotate about an axis, wherein the knob is configured to be inserted into an inside of the body along the axis or to come out of the inside of the body along the axis according to a user's manipulation; and
    a control unit, if the function is selected, configured to perform an option group transition of the selected function based on depth information according to the user's manipulation, and to control the display of a screen of an option group to which the option group transition is made,
    wherein the knob is further configured to be located in a maximum retraction depth and a plurality of different retraction depths, which are different from the maximum retraction depth, and to rotate about the axis in each retraction depth so that at least an option value is selected among the option groups of the selected function respectively and sequentially, and
    wherein the display unit is further configured to be supplied with power in response to the knob being ejected from the maximum retraction depth and to display the screen by option groups of the function when the power is supplied.

2. The user interface device of claim 1, wherein the control unit, if the option group, to which the option group transition is made, is a last option group and a selection of an option value on a screen of the last option group is completed, outputs a signal to execute the selected function.

3. The user interface device of claim 2, further comprising a storage unit in which option values, which are selected at the screens by the option groups of the selected function, respectively, are sequentially stored,
    wherein the control unit, if the selection of the option value on the screen of the last option group is completed, outputs the signal to execute the function based on a series of information of the option values stored in the storage unit.

4. The user interface device of claim 2, wherein the knob is configured to enable a pressing manipulation by a user,
    wherein the user interface device comprises a rotation sensor unit to sense an angle of rotation of the knob, and
    wherein the control unit, when the screen of the option group to which the option group transition is made is displayed, recognizes the option value selected by the user based on the angle of rotation sensed through the rotation sensor unit.

5. The user interface device of claim 1, wherein the knob is configured to enable a pressing operation by the user, and at the time of releasing the pressing, is kept pressed at a depth formed at the time of being pressed.

6. The user interface device of claim 1, wherein the knob is configured to be pressed by the user, and at the time of releasing the pressing, is extended to an original position.

7. The user interface device of claim 1, wherein the display unit is embedded at the inside of the knob.

8. The user interface device of claim 1, further comprising a button unit installed at the inside of the knob to output a signal according to a button manipulation by the user, wherein the control unit, if an option group to which the option group transition is made is a last option group, and in a state that a selection for an option value on the screen of the last option group is completed, a manipulation signal for the button unit is input, outputs a signal to execute the selected function.

9. A washing machine comprising the user interface device of claim 1.

10. An oven comprising the user interface device of claim 1.

11. A user interface device to set and control a function of an electronic apparatus, the user interface device comprising:
   a body;
   a display unit configured to display screens by option groups of the function;
   a knob configured to rotate about an axis, wherein the knob configured to be inserted into an inside of the body along the axis or to come out of the inside of the body along the axis according to a user's manipulation;
   a knob display unit configured to display a change in a depth of the knob according to the manipulation of the knob; and
   a control unit, if the function is selected, configured to perform an option group transition of the selected function based on depth information according to the user's manipulation, and to control the display of a screen of an option group to which the option group transition is made,
   wherein the knob is further configured to be located in a maximum retraction depth and a plurality of different retraction depth, which are different from the maximum retraction depth, and to rotate about the axis in each retraction depth so that at least an option value is selected among the option groups of the selected function respectively and sequentially, and
   wherein the knob display unit comprises a plurality of lamps having concentric circles.

12. The user interface device of claim 11, wherein the control unit is configured to sequentially light the lamps of the knob display unit according to the depth information of the knob sensed by a depth sensor unit sensing a depth of the knob.

13. The user interface device of claim 12, wherein the control unit increases the number of the lamps being lit as the depth of the knob becomes deeper.

14. A user interface comprising:
   a body;
   a rotatable knob configured to rotate about an axis, wherein the knob is configured to be inserted into an inside of the body along the axis or to come out of the inside of the body along the axis according to a user's manipulation, wherein the knob may move to at least one of a first depth position and a second depth position;
   a rotation sensor to detect a rotation angle of the knob;
   a controller
      to provide a first option group corresponding to the detected first depth position,
      to select, based on the detected rotation angle, a first option from the provided first option group,
      to provide a second option group corresponding to the detected second depth position and the selected first option,
      to select, based on the detected rotation angle, a second option from the provided second option group, and
      to store the selected first and second options; and
   a display screen to display the first option group and the second option group corresponding to the respective detected depth position,
   wherein the knob is further configured to be located in a maximum retraction depth and a plurality of different retraction depths, which are different from the maximum retraction depth, and to rotate about the axis in each retraction depth so that at least an option value is selected among the option groups of the selected function respectively and sequentially, and
   wherein the display screen is further configured to be supplied with power in response to the knob being ejected from the maximum retraction depth and to display the screen by option groups of the function when the power is supplied.

15. A method for selecting a first option and a second option using a rotatable knob, the method comprising:
   ejecting the knob from a minimum depth to a maximum depth;
   supplying the display, which is configured to display screens by option groups of the function, with power in response to an ejection of the knob;
   detecting respective first depth position of the knob to which the knob moves from the maximum depth;
   displaying a first option group corresponding to the detected first depth position;
   selecting, based on a detected rotation angle of the knob in the first depth position, a first option from the displayed first option group;
   detecting a second depth position of the knob to which the knob moves from the first depth position;
   displaying a second option group corresponding to the detected second depth position and the selected first option;
   selecting, based on a detected rotation angle in the second depth position, a second option from the displayed second option group; and
   storing the selected first and second options.

16. A non-transitory computer-readable recording medium storing a program to implement the method of claim 15.

* * * * *